US008680358B1

(12) United States Patent
Lee et al.

(10) Patent No.: US 8,680,358 B1
(45) Date of Patent: Mar. 25, 2014

(54) METHODS FOR REMOVING HEAVY HYDROCARBONS FROM EXTRACTIVE SOLVENTS

(71) Applicant: AMT International, Inc., Plano, TX (US)

(72) Inventors: Fu-Ming Lee, Plano, TX (US);
Tzong-Bin Lin, Chia-Yi (TW);
Kuang-Yeu Wu, Plano, TX (US);
Jyh-Haur Hwang, Chia-Yi (TW);
Tsung-Min Chiu, Chia-Yi (TW);
Ciputra Jap, Plano, TX (US);
Yung-Sheng Ho, Chia-Yi (TW)

(73) Assignees: AMT International, Inc., Plano, TX (US); CPC Corporation, Taiwan, Taipei (TW)

( * ) Notice: Subject to any disclaimer, the term of this patent is extended or adjusted under 35 U.S.C. 154(b) by 0 days.

(21) Appl. No.: 13/779,704

(22) Filed: Feb. 27, 2013

(51) Int. Cl.
*C07C 7/10* (2006.01)

(52) U.S. Cl.
USPC ........... 585/833; 585/856; 585/857; 585/804; 203/43; 203/44; 203/71; 208/311; 208/312; 208/313

(58) Field of Classification Search
USPC ................ 585/833, 856, 857; 203/43, 44, 71; 208/311–313
See application file for complete search history.

(56) References Cited

U.S. PATENT DOCUMENTS

| 4,048,062 A | 9/1977 | Asselin |
| 4,955,468 A * | 9/1990 | Lee .................................. 203/53 |
| 6,565,742 B1 * | 5/2003 | Gentry et al. ................. 208/311 |
| 2012/0037542 A1 * | 2/2012 | Wu et al. ....................... 208/313 |

OTHER PUBLICATIONS

Lee & Coombs, "Two Liquid-Phase Extractive Distillation for Aromatic Recovery," Ind. Eng. Chem. Res. (26) No. 3, 564-573, 1987.

* cited by examiner

*Primary Examiner* — Walter D Griffin
*Assistant Examiner* — Jelitza Perez
(74) *Attorney, Agent, or Firm* — Cascio & Zervas

(57) ABSTRACT

A method for cross connecting the lean solvent supply lines between the liquid liquid extraction (LLE) and the extractive distillation (ED) processes thereby using the LLE column as the outlet for removing accumulated heavy hydrocarbons (HCs) and polymeric materials from the solvent loop of both processes to maintain their solvent performance. The unique capabilities of the LLE column in rejecting heavy HCs from the solvent into a raffinate product stream that leaves the system enable the removal of the accumulated heavy HCs and polymeric materials from the closed solvent loop of the ED process when their lean solvent loop are cross connected. Cross connection requires minimum equipment change. In the revamped system, the solvent recovery column (SRC) in LLE process supplies lean solvent for the extractive distillation column while the SRC of the ED process supplies lean solvent for LLE column.

27 Claims, 3 Drawing Sheets

METHODS FOR REMOVING HEAVY HYDROCARBONS FROM EXTRACTIVE SOLVENTS

FIELD OF THE INVENTION

The present invention relates generally to techniques for integrating existing liquid-liquid extraction (LLE) and extractive distillation (ED) processes whereby the LLE column serves as the outlet for removing accumulated heavy hydrocarbons and polymeric materials from the solvent loop of both processes.

BACKGROUND OF THE INVENTION

In extractive distillation (ED) and liquid-liquid extraction (LLE) processes for aromatics recovery, the solvent is circulated in a closed loop indefinitely. The feedstock is typically treated in a prefractionator to remove the heavy portion before being fed into the EDC or LLE column. Nevertheless, measurable amounts of heavy hydrocarbons (HCs) pass through even a well-designed prefractionator operating under normal conditions. The level of heavy HCs in the feed stream is significantly higher for a poorly operated or malfunctioned prefractionator. To remove the heavy HCs and the polymerized heavy materials derivate from oxidized solvent, conventional commercial LLE processes use a thermal solvent regenerator where a small slip stream of the lean solvent is heated to recover the regenerated solvent and heavy components that have boiling points lower than that of the solvent. The heavy polymeric materials, that have boiling points higher than that of the solvent, are removed as sludge from the bottom of the solvent regenerator.

U.S. Pat. No. 4,048,062 to Asselin discloses an LLE process for aromatics recovery in which a portion of lean solvent from the bottom of a solvent recovery column (SRC) is introduced into a solvent regenerator (SRG). A stripping steam that is introduced into the SRG separately is recovered with the regenerated solvent and then introduced into the SRC as a portion of the total stripping steam. This solvent regeneration scheme works because, within the same type of molecules, the higher the boiling point, the lower the polarity (affinity with the extractive solvent). Consequently, a major portion of the measurable heavy ($C_9$ to $C_{12}$) HCs in the feedstock is rejected by the solvent phase in the LLE column and is removed with the raffinate phase as a pan of the non-aromatic product.

In an ED process for aromatics recovery, the heavy HCs tend to remain in the rich solvent at the bottom of the extractive distillation column (EDC) due to their high boiling points. Even for a narrow boiling-range ($C_6$-$C_7$) feedstock, there can be measurable amounts of heavy (C) HCs that are trapped and accumulated in the solvent, which can only be removed from the solvent by increasing the severity of the SRC (higher temperature and vacuum level, and more stripping steam) and/or by increasing the loading of the SRG. Neither alternative is desirable. Moreover, for the full boiling-range ($C_6$-$C_8$) feed, the boiling points of the heavy HCs are too high to be stripped from the solvent in the SRC and, as a result, they accumulated in the solvent as the solvent is circulated between the EDC and the SRC indefinitely in a closed loop.

The solvent regeneration of the Asselin scheme is not suitable for the ED process. The scheme was designed for LLE processes to remove minor amounts of polymeric materials generated from reactions between the oxidized or decomposed solvent components and traces of the heavy HCs in the solvent. When this scheme is applied to ED processes, heavy HCs inevitably accumulated and polymerized in the closed solvent loop until the polymerized materials reach boiling points that are higher that of sulfolane (>285° C.) before they can be removed from the bottom of the solvent regenerator. This accumulation is potentially disastrous since the presence of excessive polymeric materials not only changes the solvent properties (selectivity and solvency) significantly but the polymers also plug process equipment to render the ED process inoperable.

SUMMARY OF THE INVENTION

The present invention is based in pan on the discovery that, among the heavy ($C_9$-$C_{12}$) HCs, the $C_9$ aromatic compounds are most likely to be the only ones that are extracted by the solvent in the LLE column; most of the $C_9$ aromatics can then be stripped from the solvent in the SRC of the LLE process under normal operating conditions. In the ED process, however, these heavy hydrocarbons (HCs) remain in the rich solvent at the bottom of the EDC due to their high boiling points and quickly accumulate in the closed solvent loop.

The invention provides a method for cross connecting the lean solvent supply lines between the LLE and the ED processes. In this fashion, the LLE column becomes the outlet for removing the accumulated heavy HCs and polymeric materials (PMs) from the solvent loop of both processes to maintain their solvent performance. The invention takes advantage of the unique capability of the LLE column for rejecting the heavy HCs from the solvent as a way of removing the heavy HCs and PMs from the closed solvent loop of an ED process. The invention can be implemented by cross connecting their lean solvent loops together using low-cost revamping that requires only some piping changes to cross connect the lean solvent supply lines for the LLE column and the EDC. In other words, the revamp causes the SRC of LLE process to supply the lean solvent for the EDC, and the SRC of ED process to supply the lean solvent for LLE column.

The invention can also be implemented by incorporating, a simple mixing tank to combine the lean solvent generated from the SRC of the LLE process (containing reduced heavy HCs) and that of the ED process (containing higher heavy HCs). The mixed lean solvent supplies both the LLE column and the EDC.

In one aspect, the invention is directed to a method of integrating (i) a LLE process for producing polar HCs from mixtures comprising polar and less polar HCs wherein the LLE process employs (1) a LLE column into which a first HC feed containing polar and less polar HCs is introduced and from which a first water-containing, less polar HC-rich stream is recovered from a top of the LLE column and from which a first solvent-rich stream containing solvent, polar HCs, minor amounts of less polar HCs, and measurable but reduced heavy HCs and PMs is withdrawn from a bottom of the LLE column, (2) an extractive stripper column (ESC) into which the first solvent-rich stream is introduced and from which a less polar HC-rich stream but containing a significant of polar HCs is withdrawn from a top of the ESC and recycled to the lower portion of the LLE column as reflux and from which a second solvent-rich stream containing solvent, polar HCs, and measurable but reduced heavy HCs and PMs which is substantially free of less polar HCs is withdrawn from a bottom of the ESC and (3) a first solvent recovery column (SRC) into which the second solvent-rich stream is introduced and from which a first polar HC-rich stream, which is substantially free of solvent and less polar HCs is withdrawn and from which a third solvent-rich stream is withdrawn from a bottom of the first SRC and (ii) an extractive distillation (ED) process for producing, polar HCs from mixtures comprising polar and less polar HCs wherein ED process employs (1) an ED column into which a second HC feed containing polar and less polar HCs is introduced and from which a second water-containing, less polar HC-rich stream is recovered from a top of the EDC and from which a fourth solvent-rich stream containing solvent, polar HCs, and measurable heavy HCs and PMs is withdrawn from a bottom of the EDC (2) a second SRC into which the fourth solvent-rich stream is introduced and from which a second polar HD-rich stream, which is substantially free of solvent and less polar HCs is recovered and from which a fifth solvent-rich stream is withdrawn from a bottom of the second SRC, which method includes the steps of:

(a) diverting the majority portion (typically more than 90%) of the fifth solvent-rich stream into an upper portion of the LLE column as a selective solvent feed;

(b) diverting a minor portion (typically less than 10%) of the fifth solvent-rich stream into the ESC; and (c) diverting the third solvent-rich stream into the ED column, thereby removing heavy hydrocarbons and polymeric materials from the fifth solvent-rich stream of the extractive distillation process which contains a polar HC selective solvent, measurable amounts of heavy HCs (typically 1-5 wt %), and polymeric materials that are generated from reactions among thermally decomposed or oxidized solvent, heavy HC's, and additives.

In another aspect, the invention is directed to a method for removing HCs and PMs from a solvent-rich stream of an ED process, containing a polar HC selective solvent, measurable amounts of heavy HCs, and PMs generated from reactions among; thermally decomposed or oxidized solvent, heavy HCs, and additives, by cross connecting said solvent-rich stream with that of an adjacent LLE process, which method includes the steps of:

(a) introducing a first HC feed containing polar and less polar HCs into a middle portion of a LLE column and introducing a major portion (typically more than 90%) of the fifth solvent-rich stream in step (g) into an upper portion of the LEE column as a selective solvent feed;

(b) recovering a first water-containing, less polar HC-rich stream from a top of the LLE column and withdrawing the first solvent-rich stream containing solvent, polar HCs, minor amounts (typically 10-20 wt %) of less polar Ms, and measurable but reduced heavy HCs and PMs (typically 0.1-1 wt %) from a bottom of the LLE column;

(c) introducing a mixture comprising the first solvent-rich stream and a minor portion (typically less than 10 wt %) of a fifth solvent-rich stream from step (g), into an upper portion of an extractive stripping column (ESC), recovering a HC-rich vapor containing less polar HCs and a significant amount of benzene and heavier aromatics (typically 30-50 wt %) from a top of the ESC, which is condensed and recycled to a lower portion of LLE column as the reflux, and withdrawing a second solvent-rich stream containing solvent, polar HCs, and measurable but reduced heavy HCs and PMs (typically 0.1 to 2 wt %) which is substantially free of less polar HCs, from a bottom of the ESC;

(d) introducing the second solvent-rich stream in step (c) into a middle portion of the first solvent recovery column (SRC-1), withdrawing a first polar HC-rich stream, which is substantially free of solvent and less polar HCs, from a top of the SRC-1, and removing a third solvent-rich stream from a bottom of the SRC-1;

(e) introducing a second HC teed containing polar and less polar HCs into a middle portion of an EDC and introducing a major portion of said third solvent-rich stream from step (d) into an upper portion of the EDC as a selective solvent feed;

(f) recovering a second water-containing, less polar HC-rich stream from a top of the EDC and withdrawing a fourth solvent-rich stream containing solvent, polar HCs, and measurable heavy HCs and PMs (typically 1-5 wt %) from a bottom of the EDC;

(g) introducing said fourth solvent-rich stream into a middle portion of a second solvent recovery column (SRC-2), recovering a second polar HC-rich stream, that is substantially free of solvent and less polar HCs, from a top of the SRC-2, and removing a fifth solvent-rich stream from a bottom of the SRC-2; and (h) installing a transfer line between the third solvent-rich stream in step (d) and the fifth solvent-rich stream in step (g) to adjust the flow rate of the solvent-rich streams to the LLE column in step (a) and to the EDC in step (e).

In yet another aspect, the invention is directed to a method for removing heavy HCs and PMs from a solvent-rich stream of an ED process, containing, a polar HC selective solvent, measurable amounts of heavy HCs, and PMs generated from reactions among thermally decomposed or oxidized solvent, heavy HCs, and additives, by mixing of said solvent-rich stream with that of an adjacent LLE process, which method includes the steps of (a) introducing a first HC feed containing polar and less polar HCs into a middle portion of a LLE column and introducing a portion of sixth solvent-rich stream from step (h) into an upper portion of the LLE column as a selective solvent feed;

(b) recovering a first water-containing, less polar HC-rich stream from a top of the LLE column and withdrawing a first solvent-rich stream containing solvent, polar HCs, minor amounts of less polar HCs (typically 10-20 wt %), and measurable but reduced heavy HCs and PMs (typically 0.1-1 wt %) from a bottom of the LLE column;

(c) introducing a mixture comprising the first solvent-rich stream and a minor portion of sixth solvent-rich stream from step (h), into an upper portion of an extractive stripping column (ESC), recovering a HC-rich vapor containing less polar HCs and a significant amount of benzene and heavier aromatics (typically 30-50 wt %) from a top of the ESC, which is condensed and recycled to a lower portion of LLE column as the reflux, and withdrawing a second solvent-rich stream containing solvent, polar HCs, and measurable but reduced heavy HCs and PMs (typically 0.1-2 wt %) which is substantially free of less polar HCs, from a bottom of the ESC;

(d) introducing the second solvent-rich stream in step (c) into a middle portion of the first solvent recovery column (SRC-1), withdrawing a first polar HC-rich stream, which is substantially free of solvent and less polar FICs, from a top of the SRC-1, and removing a third solvent-rich stream from a bottom of the SRC-1 and transferring said stream to a mixing tank;

(e) introducing a second HC feed containing polar and less polar HCs into a middle portion of an EDC and introducing a portion of sixth solvent-rich stream in step (h) into an upper portion of the EDC as a selective solvent feed;

(f) recovering a second water-containing, less polar HC-rich stream from a top of the EDC and withdrawing a fourth solvent-rich stream containing solvent, polar HCs, and measurable heavy HCs and PMs (typically 1-5 wt %) from a bottom of the EDC;

(g) introducing said fourth solvent-rich stream into a middle portion of a second solvent recovery column (SRC-2), recovering a second polar HC-rich stream, that is substantially free of solvent and less polar HCs, from a top of the SRC-2, and removing a fifth solvent-rich stream from a bottom of the SRC2 and transferring said stream to said mixing tank in step (d); and (h) withdrawing a sixth solvent-rich stream from said mixing tank in step (d) and introducing a portion of said stream to the upper part of the LLE column in step (a) and another portion to the upper part of the EDC in step (e) as the solvent feeds, at predetermined flow rates.

The inventive processes are particularly suited for separation and recovery of aromatic HCs from mixtures containing aromatics and non-aromatics, including paraffins, isoparaffins, naphthenes, and/or olefins, but it is understood that the techniques are applicable to a multitude of HC mixtures. Suitable extractive solvents include, for example, sulfolane, alkyl-sulfolane, N-formyl morpholine, N-methylpyrrolidone, tetraethylene glycol, triethylene glycol, diethylene glycol, and mixtures thereof, with water as the co-solvent. For aromatic HC recovery, the most preferred solvent jointly use for both the ED and the KKE processes is sulfolane with water as the co-solvent.

The invention can be readily adapted to a large petrochemical complex that has existing, adjacent but separate LLE and ED processes that are using the same selective solvent, for producing purified polar HCs from the mixtures comprising polar and less-polar HCs generated from different sources. The invention affords a simple, low-cost method to take the advantage of the nature of the LLE and ED processes to simultaneously remove the heavy HCs and polymeric materials from both processes,

DETAILED DESCRIPTION OF THE INVENTION

Figure 1:
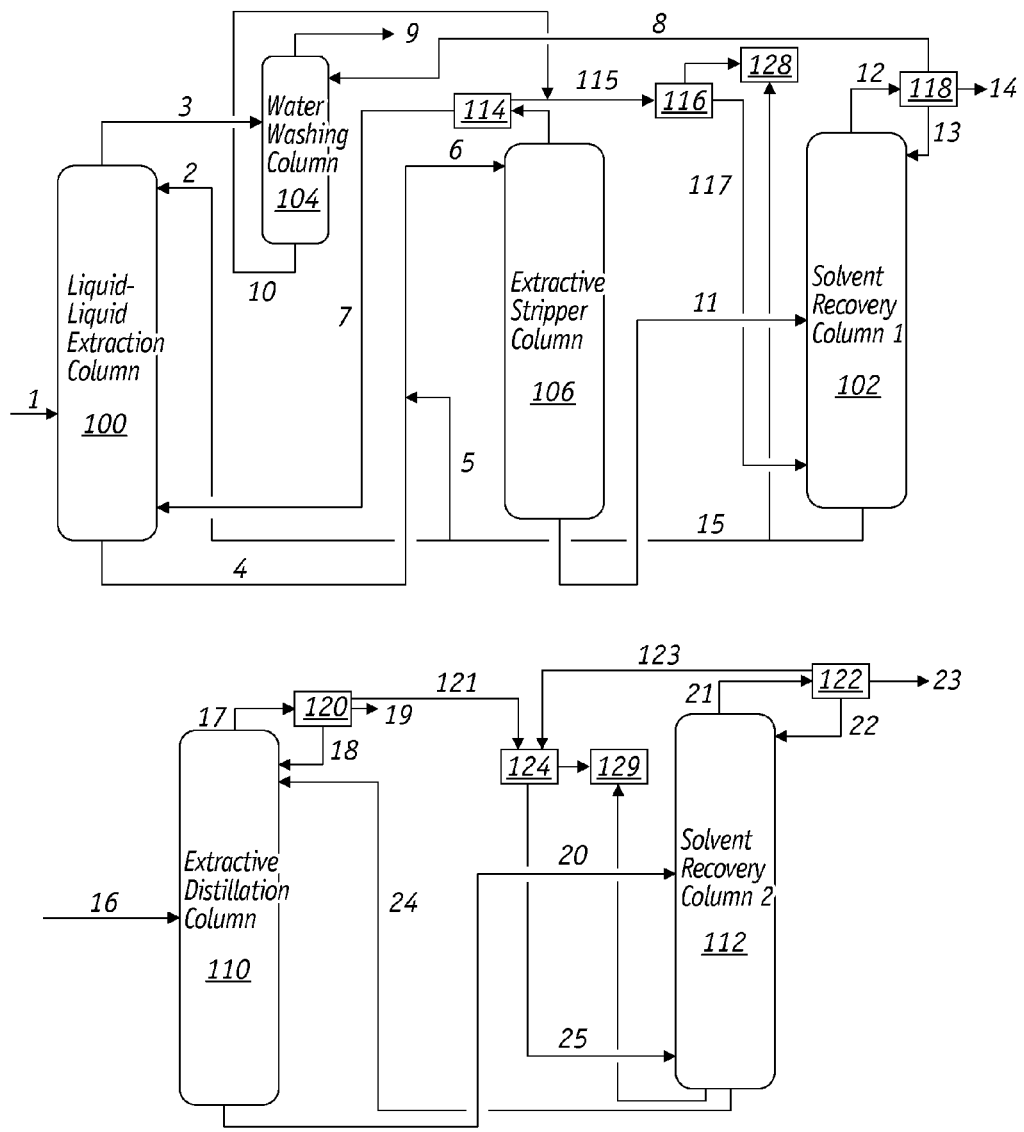
FIG. 1 is a schematic diagram of side-by-side LLE Process and ED Process (Base Case)

FIG. 1 illustrates a side-by-side LLE process and ED process for aromatic HC recovery. The LLE process employs among other devices, a liquid-liquid extraction (LLE) column 100, solvent recovery column 1 (SRC-1) 102, solvent regenerator 128, water washing column (WCC) 104, and extractive stripper column (ESC) 106. Sulfolane with water as co-solvent is used as the selective solvent. HC feed 1 containing a mixture of aromatics and non-aromatics is fed to a lower portion of the LLE column 100, while lean solvent is introduced near the top of LLE column 100 via line 2 to counter-currently contact the HC feed. The aromatic HCs in the feed typically comprise benzene, toluene, ethylbenzene, xylenes, and $C_9^+$ aromatics and the non-aromatic hydrocarbons typical comprise $C_5$ to $C_9^+$ paraffins, naphthenes and olefins.

A raffinate phase containing essentially the non-aromatics (enriched in $C_9^+$ HCs) with a minor amount of solvent is withdrawn from the top of LLE column 100 and fed to a middle portion of the WWC 104 via line 3. An extract phase (with reduced heavy HCs) from the bottom of LLE column 100 in line 4 is mixed with a secondary lean solvent from line 5; the combined stream 6 is fed to the top of ESC 106. The vapor flow through ESC 106 is generated by the action of a bottom reboiler which is heated by steam at a rate that is sufficient to control the column bottom temperature, the overhead stream composition and the flow rate. Overhead vapor exiting the top of ESC 106 is condensed in a cooler (not shown) and the condensate is transferred to an overhead receiver 114, which serves to elect a phase separation between the HC and the water phases. The HC phase, containing the non-aromatics and up to 30-40% benzene and heavier aromatics, is recycled, to a lower portion of LIE column 100 as reflux via line 7. The water phase is transferred via line 115 to a steam generator 116 to generate a part of the stripping steam for SRC-1 102.

Rich solvent consisting of the solvent, aromatics free of non-aromatics, and measurable amounts but reduced heavy HCs and polymeric materials is withdrawn from the bottom of ESC 106 and transferred to the middle portion of SRC-1 102 via line 11. Stripping steam is injected through line 117 from steam generator 116 into a lower portion of the SRC-1 102 to assist the removal of aromatic HCs from the solvent. An aromatic concentrate, containing water and being substantially free of solvent and non-aromatic HCs, is withdrawn as an overhead vapor stream from SRC-1 102 and introduced into an overhead receiver 118 via line 12 after being condensed in a cooler (not shown). In order to minimize the bottom temperature of SRC-1 102, overhead receiver 118 is connected to a vacuum source to generate sub-atmospheric conditions in SRC-1 102. Overhead receiver 118 serves to effect a phase separation between the aromatic HC and the water phases. A portion of the aromatic HC phase is recycled to the top of SRC-1 102 as reflux via line 13, while the remainder portion is withdrawn as aromatic HC product through line 14.

The water phase that accumulates in the water leg, of overhead receiver 118 is fed via line 8 to WWC 104 as wash water at a location that is below the interface between the HC phase and the water phase near the top of WWC 104. The solvent is removed from the LLE raffinate through a countercurrent water wash and the solvent-free HCs, which accumulate in the HC phase of WWC 104, are then withdrawn from the top of the column as solvent-free raffinate product through line 9. A water phase, containing the solvent, exits through line 10 from the bottom of WWC 104 and is fed to steam generator 116 along with the water phase from ESC overhead receiver 114, where the water is transformed into stripping steam that is introduced into the SRC-1 via line 117 and also into a thermal solvent regenerator 128. The majority of the lean solvent (with reduced heavy HCs) from the bottom of the SRC-1 102 is recycled via lines 15 and 2 as a lean solvent feed that is supplied to an upper portion of LLE column 100 for extracting the aromatic HCs in the LLE column. A minor portion of said lean solvent is recycled through lines 15 and 5 as a secondary solvent for ESC.

Another minor portion of the lean solvent stream from the bottom of the SRC-1 102 is diverted into thermal solvent regenerator 128 and steam is introduced therein to assist the stripping of the solvent and heavy HCs from the sludge. To minimize the bottom temperature of solvent regenerator 128, it is preferably operated under reduced pressure (vacuum). Still another minor portion of the lean solvent is heated in a reboiler and recycled to the bottom of SRC-1 102.

FIG. 1 also depicts a separate ED process for aromatic HC recovery, which employs an extractive distillation column (EDC) 110, solvent recovery column 2 (SRC-2) 112, and thermal solvent regenerator 129. Sulfolane with water is used as the selective solvent. HC feed 16 containing a mixture of aromatic and non-aromatic HCs is fed to the middle portion of EDC 110, while a lean solvent from the bottom of SRC-2 112 is fed via line 24 to near the top of EDC 110 below the overhead reflux entry point for line 18.

Non-aromatics vapor exiting the top of EDC 110 through line 17 is condensed in a condenser (not shown) and the condensate is transferred to an overhead receiver 120, which serves to effect a phase separation between the non-aromatic HCs and the water phases. A portion of the non-aromatic HC phase is recycled to the top of EDC 110 as the reflux via lines 18 as a second portion is withdrawn as the raffinate product through line 19. The water phase in line 121 from overhead receiver 120 and the water from SRC-2 overhead 122 via line 123 are transferred to a steam generator 124 to form stripping steam that is introduced into SRC-2 112 via line 25 and into solvent recovery generator 129. The rich solvent stream containing the solvent, aromatics, and measurable levels of heavy HCs is withdrawn from the bottom of EDC 110. A portion of the rich solvent is heated in an EDC reboiler (not shown) and recycled to the bottom of EDC 110 to generate vapor stream in the column, while the rest of the rich solvent is fed to the middle portion of SRC-2 112 through line 20.

Stripping steam when injected via line 25 into the lower portion of SRC-2 112 assists in the removal of aromatic HCs from the solvent. An aromatic concentrate, containing water and which is substantially free of solvent and non-aromatic HCs, is withdrawn through line 21 as an overhead vapor stream from SRC-2 112; after the steam is condensed in a condenser (not shown) the liquid is introduced into an overhead receiver 122 which serves to effect a phase separation between the aromatic HC phase and the water phase. A portion of the aromatic HC phase is recycled to the top of SRC-2 112 as the reflux via line 22, while the remaining portion is withdrawn as the aromatic HC product through line 23. The water phase in stream 123, along with the water from EDC overhead 120, are transferred to a steam generator 124 to form stripping steam for SRC-2 112.

In order to minimize the bottom temperature of SRC-2 112, overhead receiver 122 is connected to a vacuum source to generate sub-atmospheric conditions in SRC-2 112. A lean solvent stream containing measurable amounts of heavy HCs is withdrawn from the bottom of SRC-2 112. The majority proportion thereof is recycled via line 24 as the lean solvent feed to the upper portion of EDC 110 for extracting the aromatic HCs in EDC 110. A minor portion of the lean solvent stream from the bottom of the SRC-2 112 is diverted into thermal solvent regenerator 129 and steam is introduced therein to assist the stripping of the solvent and heavy HCs from the sludge. To minimize the bottom temperature of solvent regenerator 129, it is preferably operated under reduced pressure (vacuum). Another minor portion of the lean solvent is heated in a reboiler and recycled to the bottom of SRC-2 112.

In one embodiment of the invention for aromatic HC recovery, the above side-by-side LLE and ED processes are revamped with some piping changes to cross connect the lean solvent supply lines for the LLE column and the EDC, with no additional process equipment necessary. The modified integrated configuration causes the solvent recovery column of the LLE process to supply the lean solvent for the EDC, and the solvent recovery column of the ED process to supply the lean solvent for LLE column.

Figure 2:
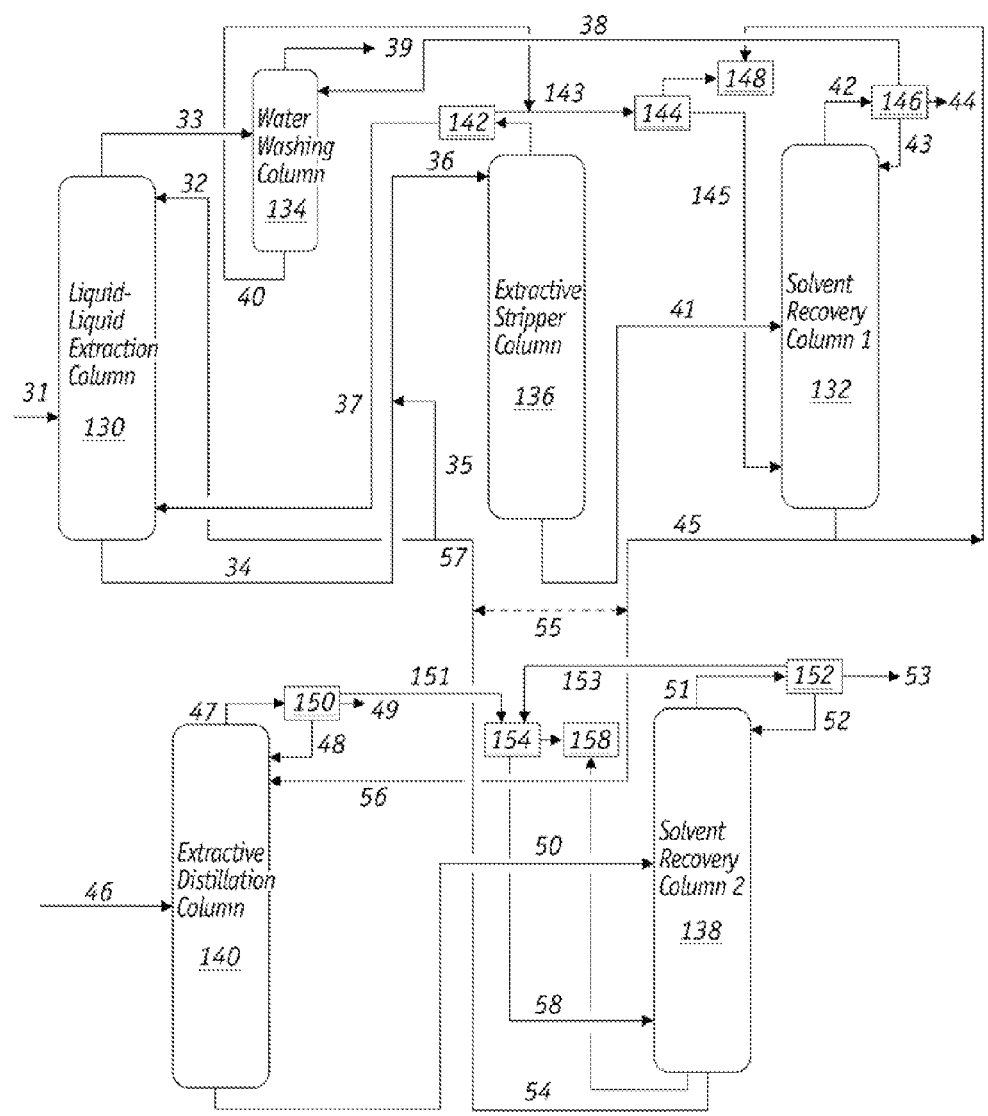
FIG. 2 is a schematic diagram of an LLE and ED processes with cross connection of lean solvent supply lines.

As shown in FIG. 2, in operation an HC feed 31 containing a mixture of aromatics and non-aromatics is fed to a lower portion of LLE column 130, while lean solvent from the bottom of SRC-2 138 (the solvent recovery column for the ED process) is introduced near the top of LLE column 130 via lines 54, 57, and 32 to counter-currently contact the HC feed. The aromatic HCs in the feed typically comprise benzene, toluene, ethylbenzene, xylenes, and $C_9^+$ aromatics and the non-aromatic HCs typical comprise $C_1$ to $C_9^+$ paraffins, naphthenes and olefins.

A raffinate phase containing essentially the non-aromatics (enriched in $C_9^+$ HCs) with a minor amount of solvent is withdrawn from the top of LLE column 130 and fed to a middle portion of WWC 134 via line 33. An extract phase (with reduced heavy HCs and polymeric materials) from the bottom of LLE column 130 in line 34 is mixed with a secondary lean solvent from line 35; the combined stream 36 is fed to the top of ESC 136. The vapor flow through ESC 136 is generated by the action of a bottom reboiler which is heated by steam at a rate that is sufficient to control the column bottom temperature, the overhead stream composition and the flow rate. Overhead vapor exiting the top of ESC 136 is condensed and the condensate is transferred to an overhead receiver 142, which effects a phase separation between the HC and the water phases. The HC phase, containing the non-aromatics and up to 30-40% benzene and heavier aromatics, is recycled to the lower portion of LLE column 130 as reflux via line 37. The water phase is transferred via line 143 to a steam generator 144 to generate stripping steam for SRC-1 132. Rich solvent consisting of the solvent, aromatics free of non-aromatics, and measurable amounts but reduced heavy HCs and polymeric materials is withdrawn from the bottom of ESC 136 and transferred to the middle portion of SRC-1 132 via line 41. Stripping steam is injected from steam generator 144 into a lower portion of SRC-1 132 via line 145 to assist in the removal of aromatic HCs from the solvent. An aromatic concentrate, containing water and being substantially free of solvent and non-aromatic HCs, is withdrawn as an overhead vapor stream from SRC-1 132 and introduced into an overhead receiver 146 via line 42 after being condensed. In order to minimize the bottom temperature of SRC-1 132, overhead receiver 146 is connected to a vacuum source to generate sub-atmospheric conditions in SRC-1 132.

Overhead receiver 146 effects a phase separation between the aromatic HC and the water phases. A portion of the aromatic HC phase is recycled to the top of SRC-1 132 as reflux via line 43, while the remainder portion is withdrawn as aromatic HC product through line 44. The water phase that accumulates in the water leg of overhead receiver 146 is fed via line 38 to the WWC 134 as wash water at a location below the interface between the HC phase and the water phase near the top of WWC 134. The solvent is removed from the LLE raffinate through a counter-current water wash and the solvent-free HCs, which accumulate in the HC phase of WWC 134, are then withdrawn from the top of the column as solvent-free raffinate product through line 39. A water phase, containing the solvent, exits through line 40 from the bottom of WWC 134 and the water phase from ESC overhead receiver 142 via line 143 are fed to steam generator 144 where it is transformed into stripping steam that is introduced into the SRC-1 132 via line 145 and also into the thermal solvent regenerator 148.

The majority of the lean solvent (with reduced heavy HCs and polymeric materials) from the bottom of SRC-1 132 is recycled via lines 45 and 56 to an upper portion of EDC 140, instead of LLE column 130, as the lean solvent feed. Another minor portion of the lean solvent stream from the bottom of SRC-1 132 is diverted into thermal solvent regenerator 148. Steam is introduced into solvent regenerator 148 to assist the stripping of the solvent and heavy HCs from the sludge. It is preferable to operate solvent regenerator 148 under reduced pressure (vacuum) in order to minimize its bottom temperature. A still another minor portion of the lean solvent (not shown) is heated in a reboiler (not shown) and recycled to the bottom of SRC-1 132.

As further shown in FIG. 2, an HC feed containing a mixture of aromatic and non-aromatic HCs is fed via line 46 to the middle portion of EDC 140, while a lean solvent from the bottom of SRC-1 132 (the solvent recovery column for the LLE process) is fed via lines 45 and 56 to near the top of EDC 140 below the overhead reflux entry point of line 48.

Non-aromatics vapor exiting the top of EDC 140 through line 47 is condensed and the condensate is transferred to an overhead receiver 150, which effects a phase separation between the non-aromatic HC and the water phases. A portion of the non-aromatic HC phase is recycled to the top of EDC 140 as the reflux via lines 48 as a second portion is withdrawn as the raffinate product through line 49. The water phase 151 from overhead receiver 150 and water stream 153 from SRC-2 overhead 152 are transferred to a steam generator 154 to form stripping steam that is introduced into SRC-2 138 via line 58 and into a solvent recovery generator 158. The rich solvent stream containing the solvent, aromatics, and measurable levels of heavy HCs and PMs is withdrawn from the bottom of EDC 140. A portion of the rich solvent is heated in an EDC reboiler and recycled to the bottom of EDC 140 to generate vapor stream in the column, while the rest of the rich solvent is fed to the middle portion of SRC-2 138 through line 50.

Stripping steam when injected via line 58 into the lower portion of the SRC-2 assists in the removal of aromatic HCs from the solvent. An aromatic concentrate, containing water and which is substantially free of solvent and non-aromatic HCs, is withdrawn through line 51 as an overhead vapor stream from SRC-2 138 and after the vapor is condensed, the liquid is introduced into an overhead receiver 152. The overhead receiver 152 effects a phase separation between the aromatic HC phase and the water phase. A portion of the aromatic HC phase from receiver 152 is recycled to the top of SRC-2 138 as the reflux via line 52, while the remaining portion is withdrawn as the aromatic HC product through line 53. The water phase 153 and water 151 from EDC overhead 150 are transferred to a steam generator 154 to form stripping steam for SRC-2 138.

To minimize the bottom temperature of SRC-2 138, overhead receiver 152 is connected to a vacuum source to generate sub-atmospheric conditions in SRC-2 138. A lean solvent stream containing measurable amounts of heavy HCs and PMs is withdrawn from the bottom of SRC-2 138. The majority thereof is recycled via lines 54, 57, and 32 as the lean solvent feed to the upper portion of LLE column 130 for extracting the aromatic HCs; and a minor proportion is recycled via line 35 as a secondary solvent to ESC 136. Another minor portion of the lean solvent stream from the bottom of SRC-2 138 is diverted into thermal solvent regenerator 158. Steam is introduced into solvent regenerator 158 to assist the stripping of the solvent and heavy HCs from the sludge. It is preferable to operate solvent regenerator 158 under reduced pressure (vacuum) in order to minimize its bottom temperature. A still another minor portion of the lean solvent (not shown) is heated in a reboiler (not shown) and recycled to the bottom of SRC-2 138.

For the process configuration in FIG. 2, the flow rate of the crossed lean feeds to LLE column and EDC is preferably adjusted with a crossover line (line 55) even if a similar amount of HC feedstock with similar composition is fed to each of the processes. This is because the LLE process and the ED process are operated under different Solvent-to-HC feed ratios (S/F). Thus, for example, if the S/F of LLE column 130 is higher than that of EDC 140, line 55 moves lean solvent from line 45 to line 54, and vice versa.

Figure 3:
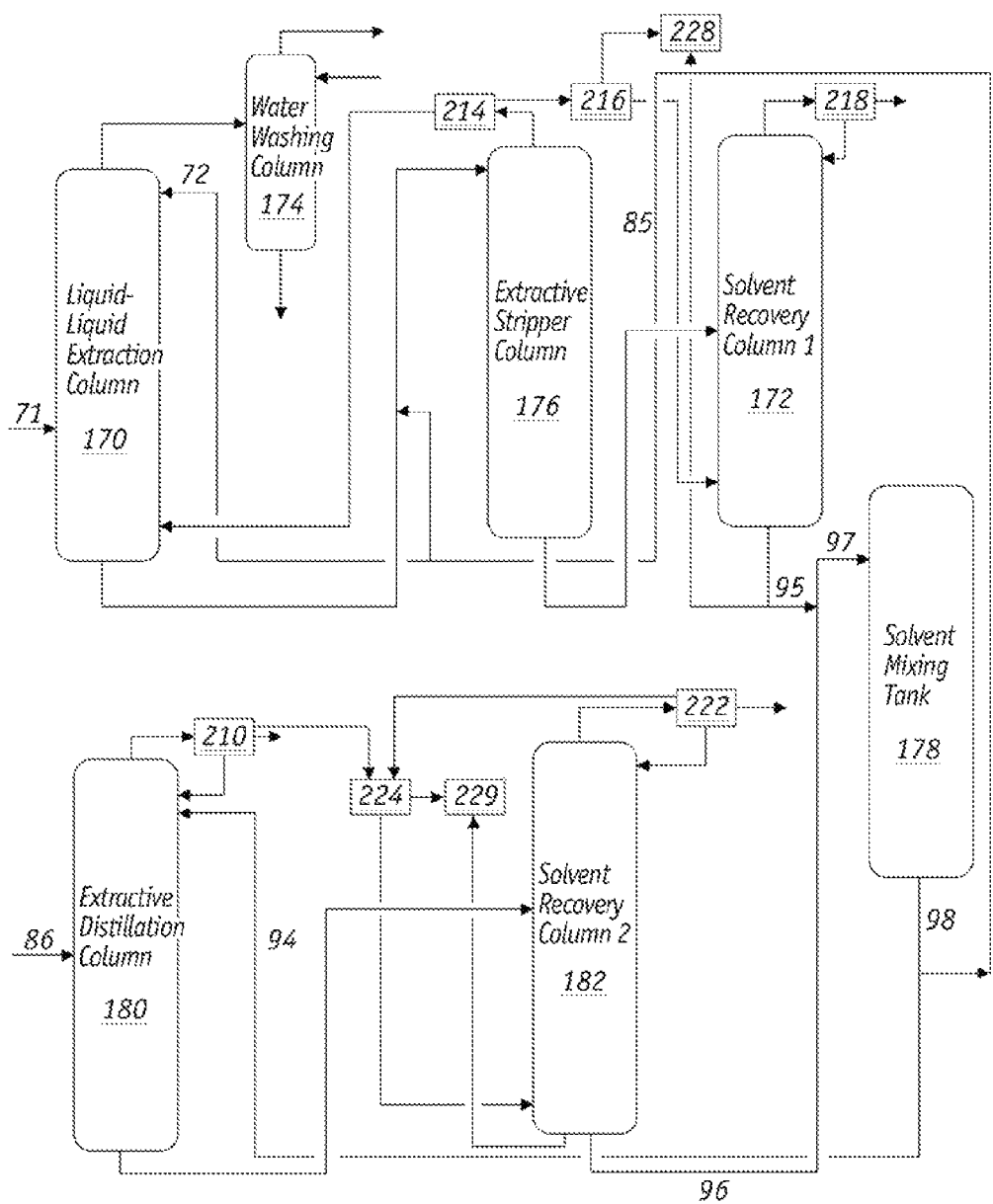
FIG. 3 is a schematic diagram of LLE and ED processes that are connected with a common lean solvent supply tank.

In another embodiment of the invention for aromatic HC recovery, the side-by-side LLE and ED processes depicted in FIG. 1 are converted into the flow scheme as shown in FIG. 3, wherein a lean solvent mixing tank (ST) 178 is installed to mix the lean solvent that is generated from SRC-1 172 (of the LLE process) and SRC-2 182 (of the ED process). In this integrated configuration, LLE column 170, ESC 176, SRC-1 172, WWC 174, along with overhead receiver 214, steam generator 216, overhead receiver 218 and thermal solvent generator 228 in the LLE process generally operate in the same manner as their corresponding unit operations in the scheme shown in FIG. 1. Similarly, ED column 180, SRC-2 182, along with overhead receiver 210, steam generator 224, overhead receiver 222 and thermal solvent regenerator 229 in the ED process generally operate in the same manner as their corresponding unit operations in the scheme shown in FIG. 1.

In operation, as shown in FIG. 3, an HC feed containing a mixture of aromatics and non-aromatics is fed via line 71 to a lower portion of LLE column 170 while an HC feed containing a mixture of aromatics and non-aromatics is fed via line 86 to the middle portion of EDC 180. In this modified process, a greater portion of the lean solvent from the bottom of SRC-1 172 is transferred to ST 178 via lines 95 and 97 whereas a greater portion of the lean solvent from the bottom of the SRC-2 182 is introduced to ST 178 through lines 96 and 97. Subsequently, a common lean solvent feed, with reduced heavy HCs and PMs which is attributable to the function of LLE column 170 for removing the heavies, is fed to both LLE column 170 and EDC 180.

EXAMPLES

Example 1

This example demonstrates that a major portion of the heavy ($C_9^+$) HCs in the feed are removed in the liquid-liquid extraction (LLE) column by the raffinate stream. Only a minor portion of the $C_9^+$ HCs in the feed remains in the closed lean solvent loop and is eventually removed from the lean solvent through a solvent regenerator. This is one of the features that enable LLE process to recover benzene, toluene, and xylene (BTX) aromatics from the full-boiling range ($C_6$-$C_8$) HC feed. All the data were generated from a process model which was upgraded with actual experimental data.

Referring to FIG. 1, a full-boiling range feed is fed to the lower portion of a LLE column via line 1. The feed composition and flow rate are given in Table 1.

TABLE 1

| Hydrocarbon Feed Flow Rate: 50,000 Kg/Hr | | | | |
|---|---|---|---|---|
| n-Paraffins | Isoparaffins | Olefins | Naphthenes | Aromatics |
| (Unit in weight %) | | | | |

| | n-Paraffins | Isoparaffins | Olefins | Naphthenes | Aromatics |
|---|---|---|---|---|---|
| $C_5^-$ | 0.633 | 0.558 | 0.042 | 0.294 | 0.0 |
| $C_6$ | 3.25 | 3.904 | 0.226 | 4.470 | 20.950 |
| $C_7$ | 2.338 | 7.758 | 0.427 | 2.043 | 20.313 |
| $C_8$ | 0.766 | 1.796 | 0.102 | 0.772 | 22.937 |
| $C_9$ | 0.247 | 0.574 | 0.0 | 0.188 | 5.034 |
| $C_{10}$ | 0.019 | 0.092 | 0.0 | 0.04 | 0.148 |
| $C_{11}$ | 0.0 | 0.0 | 0.024 | 0.0 | 0.011 |
| $C_{12}$ | 0.0 | 0.0 | 0.0 | 0.0 | 0.037 |

Lean solvent (sulfolane with water) from the bottom of the SRC column is fed to the upper portion of the LLE column via lines 15 and 2 under a pre-determined solvent-to-feed ratio. The raffinate stream is then withdrawn from the top of LLE column through line 3 and fed to the middle portion of a water washing column (WWC) to remove minor amount of sulfolane from the raffinate. The washing water is collected from overhead of the SRC and introduced into upper portion of the WWC via line 8. The washed raffinate product is taken from overhead of the WWC through line 9. The composition and flow rate of the raffinate product are presented in Table 2.

TABLE 2

Raffinate Product Flow rate: 15,599 Kg/Hr

| | n-Paraffins | Isoparaffins | Olefins | Naphthenes | Aromatics |
|---|---|---|---|---|---|
| | (Unit in weight %) | | | | |
| $C_5^-$ | 2.029 | 1.857 | 0.128 | 0.869 | 0.0 |
| $C_6$ | 11.072 | 13.673 | 0.59 | 12.606 | 0.066 |
| $C_7$ | 7.681 | 25.073 | 1.559 | 6.257 | 0.024 |
| $C_8$ | 2.458 | 5.181 | 0.243 | 3.318 | 0.165 |
| $C_9$ | 0.797 | 1.269 | 0.0 | 1.313 | 1.041 |
| $C_{10}$ | 0.022 | 0.266 | 0.0 | 0.0 | 0.311 |
| $C_{11}$ | 0.0 | 0.0 | 0.0 | 0.0 | 0.015 |
| $C_{12}$ | 0.0 | 0.0 | 0.0 | 0.0 | 0.058 |

An extract stream of the LLE column is withdrawn from the bottom and fed to the top of an extractive stripper column (ESC) via lines 4 and 6. Vapor of the light non-aromatic rich HCs is removed from the top of ESC and recycled to the lower portion of LLE column via line 7 after condensing and separating the water phase in a phase separator. Water from the phase separator is sent to a steam generator for generating a part of stripping steam for the SRC and the SRG.

Rich solvent is withdrawn from the bottom of ESC and sent to the middle of portion of the SRC through line 11. As mentioned above, stripping steam generated from a steam generator is fed to lower portion of the SRC via line 117 to strip the aromatic HCs from the rich solvent. The vaporous aromatic HCs and steam are withdrawn from the top of SRC via line 12 and the extract (aromatic) product is taken from line 14 after condensing and separating the water phase in a phase separator (not shown), and after a portion of which is recycled to the SRC as the reflux via line 13. Water from the phase separator is sent as washing water to the WWC through line 8. The composition and flow rate of the extract product is summarized in Table 3.

TABLE 3

Extract Product Flow rate: 34,083 Kg/Hr

| | n-Paraffins | Isoparaffins | Olefins | Naphthenes | Aromatics |
|---|---|---|---|---|---|
| | (Unit in weight %) | | | | |
| $C_6$ | 0.0 | 0.0 | 0.0 | 0.0 | 30.363 |
| $C_7$ | 0.0 | 0.0 | 0.0 | 0.0 | 30.034 |
| $C_8$ | 0.0 | 0.0 | 0.0 | 0.0 | 33.514 |
| $C_9$ | 0.0 | 0.0 | 0.0 | 0.0 | 6.084 |
| $C_{10}$ | 0.0 | 0.0 | 0.0 | 0.0 | 0.005 |
| $C_{11}$ | 0.0 | 0.0 | 0.0 | 0.0 | 0.0 |
| $C_{12}$ | 0.0 | 0.0 | 0.0 | 0.0 | 0.0 |

Based on the stream compositions and flow rates presented in Tables 1 to 3, the portion of heavy ($C_9^+$) HCs removed by the raffinate stream of LLE column are summarized in Table 4.

TABLE 4

| | (Unit: Kg/Hr) | | | | % Removal |
|---|---|---|---|---|---|
| | Feed | Raffinate | Extract | Lean Solvent | By Raffinate |
| $C_9$ | 3021.5 | 689.5 | 2093.0 | 239.1 | 22.8* |
| $C_{10}$ | 149.5 | 93.4 | 1.7 | 54.4 | 62.5 |

TABLE 4-continued

| | (Unit: Kg/Hr) | | | | % Removal |
|---|---|---|---|---|---|
| | Feed | Raffinate | Extract | Lean Solvent | By Raffinate |
| $C_{11}$ | 17.5 | 2.3 | 0.0 | 15.2 | 13.4 |
| $C_{12}$ | 18.5 | 9.1 | 0.0 | 9.4 | 48.9 |
| Total | 3207.0 | 794.3 | 2094.7 | 318.1 | |

*Although the raffinate stream removes only 22.8% $C_9$ HCs in the feed, roughly 69.3% $C_9$ HCs in the feed are stripped from the solvent as a part of the extract product and only 7.9% are left in the lean solvent.

As shown in Table 4, roughly 50 to 60% of $C_{10}^+$ HCs is removed by the raffinate stream of the LLE column, except $C_{11}$ HCs which contain only olefins (more polar than the paraffins) and aromatics (more polar compounds tend to stay in extract stream with sulfolane). The remaining portion of $C_{10}^+$ HCs circulates in the closed solvent loop until the HCs polymerized into heavier species having boiling point higher 285° C. (boiling point of sulfolane) and are removed as sludge from the bottom of a conventional thermal solvent regenerator. To continuously remove the sludge and the impurities generated from decomposed or oxidized sulfolane from the lean solvent, a split stream of the lean solvent is fed a thermal solvent regenerator, where sulfolane and lower boiling components were recovered under heating and steam stripping.

Example 2

This example demonstrates that, in recovering BTX aromatics from the full-boiling range ($C_6$-$C_8$) HCs feed by an ED process, nearly all of the heavy ($C_9^+$) HCs in the feed remains circulating in the closed lean solvent loop and cannot be removed from the loop until becoming heavier species having boiling point higher 285° C. (boiling point of sulfolane) through polymerization, which are then removed as sludge from the bottom of a solvent regenerator (SRG). All the data presented in this example were generated from a process model which was upgraded with actual experimental data from a continuous ED process for recovering BTX aromatics from a full-boiling range pyrolysis gasoline, disclosed in article: "Two Liquid-Phase Extractive Distillation for Aromatics Recovery", Ind. Eng. Chem. Res. (26) No. 3, 564-573, 1987.

Referring to FIG. 1, a full-boiling range feed is fed to the middle portion of the extractive distillation column (EDC) via line 16. The feed composition and flow rate are given in Table 1. Lean solvent (sulfolane with water) from the bottom of the SRC is fed to the upper portion of the EDC via line 24, under a pre-determined solvent-to-feed ratio. The raffinate stream is then withdrawn from the top of EDC through line 17 through a condenser (not shown) into a phase separator (not shown) to decant the water phase. A portion of the raffinate is recycled to the EDC as the reflux via line 18 and the remaining portion is taken the raffinate product through line 19. Composition and flow rate of the raffinate product is presented in Table 5.

TABLE 5

Raffinate Product Flow rate: 14,815 Kg/Hr

| | n-Paraffins | Isoparaffins | Olefins | Naphthenes | Aromatics |
|---|---|---|---|---|---|
| | (Unit in weight %) | | | | |
| $C_5^-$ | 2.136 | 1.955 | 0.135 | 0.915 | 0.0 |
| $C_6$ | 11.658 | 14.397 | 0.620 | 13.274 | 0.174 |
| $C_7$ | 8.088 | 26.401 | 1.642 | 6.588 | 0.069 |

TABLE 5-continued

Raffinate Product Flow rate: 14,815 Kg/Hr

|       | n-Paraffins | Isoparaffins | Olefins | Naphthenes | Aromatics |
|-------|-------------|--------------|---------|------------|-----------|
|       | (Unit in weight %) | | | | |
| $C_8$ | 2.588 | 5.455 | 0.256 | 3.494 | 0.025 |
| $C_9$ | 0.050 | 0.080 | 0.0 | 0.020 | |

Rich solvent is withdrawn from the bottom of EDC and send to the middle of portion of the SRC through line 20. The composition of the rich solvent is presented in Table 6 on a solvent-free basis.

TABLE 6

|          | n-Paraffins | Isoparaffins | Olefins | Naphthenes | Aromatics |
|----------|-------------|--------------|---------|------------|-----------|
|          | (Unit in weight % on Solvent-Free Basis) | | | | |
| $C_6$    | 0.0   | 0.0   | 0.0   | 0.0   | 29.458 |
| $C_7$    | 0.0   | 0.0   | 0.0   | 0.0   | 28.598 |
| $C_8$    | 0.102 | 0.0   | 0.0   | 0.158 | 32.619 |
| $C_9$    | 0.333 | 0.782 | 0.0   | 0.259 | 7.159 |
| $C_{10}$ | 0.028 | 0.131 | 0.0   | 0.057 | 0.210 |
| $C_{11}$ | 0.0   | 0.0   | 0.034 | 0.0   | 0.016 |
| $C_{12}$ | 0.0   | 0.0   | 0.0   | 0.0   | 0.053 |

As shown in Table 6, nearly all the heavy ($C_9^+$) hydrocarbons in the feed stay at the bottom of the EDC with the rich solvent, while the raffinate stream from the top of the EDC contains only trace of $C_9^+$ hydrocarbons (see Table 5). In normal operations, the SRC is operated with stripping steam at a reboiler temperature in the range of 170 to 185° C. under a reduced pressure in the range of 0.4 to 0.7 atmospheric pressure. Higher temperatures would cause accelerated thermal decomposition of sulfolane (hourly decomposition rate is approximately 0.001 to 0.01% when temperatures exceed 200° C.). Under normal operating condition, the SRC overhead (aromatic) product contains all the $C_6$ to $C_8$ aromatics, a portion of $C_9$ aromatics, and trace of $C_{10}$ aromatics as shown in Table 3 in Example 1. Therefore, a portion of $C_9$ hydrocarbons and essentially all the $C_{10}^+$ hydrocarbons in the rich solvent as shown in Table 6, will stay at the bottom of the SRC with the lean solvent. For a ED process with 50,000 Kg/Hr throughput, the accumulation rate of $C_9^+$ HCs in the lean solvent loop is estimated to be 1,091 Kg/Hr (almost 3.5 times of the rate of the LLE process with same throughput). This amount of heavies in the lean solvent would overburden the conventional thermal solvent regenerator and could cause the solvent performance to deteriorate quickly rendering the ED process inoperable, even at much higher solvent regeneration rates.

What is claimed is:

1. A method of integrating (i) a liquid-liquid extraction (LLE) process for producing polar hydrocarbons (HCs) from mixtures comprising polar and less polar HCs wherein the LLE process employs (1) a LLE column into which a first HC feed containing polar and less polar HCs is introduced and from which a first water-containing, less polar HC-rich stream is recovered from a top of the LLE column and from which a first solvent-rich stream containing solvent, polar HCs, minor amounts of less polar HCs, and measurable but reduced heavy HCs and polymeric materials (PMs) is withdrawn from a bottom of the LLE column, (2) an extractive stripper column (ESC) into which the first solvent-rich stream is introduced and from which a less polar HC-rich stream but containing a significant of polar HCs is withdrawn from a top of the ESC and recycled to the lower portion of the LLE column as reflux and from which a second solvent-rich stream containing solvent, polar HCs, and measurable but reduced heavy HCs and PMs which is substantially free of less polar HCs is withdrawn from a bottom of the ESC and (3) a first solvent recovery column (SRC) into which the second solvent-rich stream is introduced and from which a first polar HC-rich stream, which is substantially free of solvent and less polar HCs is withdrawn and from which a third solvent-rich stream is withdrawn from a bottom of the first SRC and (ii) an extractive distillation (ED) process for producing polar hydrocarbons (HCs) from mixtures comprising polar and less polar HCs wherein ED process employs (1) an ED column into which a second HC feed containing polar and less polar HCs is introduced and from which a second water-containing, less polar HC-rich stream is recovered from a top of the EDC and from which a fourth solvent-rich stream containing solvent, polar HCs, and measurable heavy HCs and PMs is withdrawn from a bottom of the EDC (2) a second SRC into which the fourth solvent-rich stream is introduced and from which a second polar HC-rich stream, which is substantially free of solvent and less polar HCs is recovered and from which a fifth solvent-rich stream from a bottom of the second SRC is withdrawn, which method comprises the steps of:
   (a) diverting the majority portion of the fifth solvent-rich stream into an upper portion of the LLE column as a selective solvent feed whereby heavy HCs are rejected by the solvent in the LLE column;
   (b) diverting a minor portion of the fifth solvent-rich stream into the ESC; and
   (c) diverting the third solvent-rich stream into the ED column, thereby removing heavy HCs and PMs from the fifth solvent-rich stream of the ED process which contains a polar HC selective solvent, measurable amounts of heavy HCs, and PMs that are generated from reactions among thermally decomposed or oxidized solvent, heavy HCs, and additives thereby preventing heavy HCs from accumulating in an otherwise closed solvent loop of the ED process due to the heavy HCs's high boiling points.

2. The method of claim 1 wherein the polar HCs are aromatic and the less polar HCs are paraffinic, naphthenic, and olefinic.

3. The method of claim 1 wherein the solvent is selected from the group consisting of sulfolane, alkyl-sulfolane, N-formyl morpholine, N-methyl pyrrolidone, tetraethylene glycol, triethylene glycol, diethylene glycol, and mixtures thereof, with water as the co-solvent.

4. The method of claim 1 wherein the solvent comprises sulfolane with water as the co-solvent.

5. The method of claim 1 wherein the first and second HC feeds have the same composition.

6. The method of claim 1 wherein the first and second HC feeds have different compositions.

7. The method of claim 1 which comprises the step of:
   positioning a transfer line between the third solvent-rich stream and the fifth solvent-rich stream and adjusting the flow rate of the solvent-rich streams to the LLE column and to the EDC.

8. The method of claim 7 which comprises the step of:
   introducing a mixture comprising the fifth solvent-rich stream and a minor portion of the third solvent-rich stream into an upper portion of the LLE column and the ESC.

9. The method of claim 7 which comprises the step of:
   introducing a mixture comprising the third solvent-rich stream and a minor portion of the fifth solvent-rich stream into an upper portion of the EDC.

10. The method of claim 1 which comprises the steps of:
  providing a mixing tank;
  transferring the third solvent-rich stream and the fifth solvent-rich stream into the mixing tank to form a solvent-rich mixture; and
  introducing the solvent-rich mixture into an upper portion of the LLE column and ESC and into an upper portion of the EDC at predetermined flow rates.

11. The method of claim 1 wherein none of the fifth solvent-rich stream from the second SRC is introduced directly into the EDC.

12. A method for removing heavy hydrocarbons (HCs) and polymeric materials (PMs) from a solvent-rich stream of an extractive distillation process, wherein the solvent-rich stream contains a polar hydrocarbon (HC) selective solvent, measurable amounts of heavy HCs, and PMs that are generated from reactions among thermally decomposed or oxidized solvent, heavy HCs, and additives, by cross connecting the solvent-rich stream with that of a liquid-liquid extraction (LLE) process, which method comprises the steps of:
  (a) introducing a first HC feed containing polar and less polar HCs into a middle portion of a LLE column and introducing a selective solvent feed into an upper portion of the LLE column;
  (b) recovering a first water-containing, less polar HC-rich stream from a top of the LLE column and withdrawing a first solvent-rich stream containing solvent, polar HCs, less polar HCs, and heavy HCs and PMs from a bottom of the LLE column;
  (c) introducing a mixture comprising the first solvent-rich stream into an upper portion of an extractive stripping column (ESC), recovering a HC-rich vapor containing less polar HCs and benzene and heavier aromatics from a top of the ESC, which vapor is condensed and recycled to a lower portion of LLE column as the reflux, and withdrawing a second solvent-rich stream containing solvent, polar HCs, and heavy HCs and PMs which is substantially free of less polar HCs, from a bottom of the ESC;
  (d) introducing the second solvent-rich stream in step (c) into a middle portion of a first solvent recovery column (first SRC), withdrawing a first polar HC-rich stream, which is substantially free of solvent and less polar HCs, from a top of the first SRC, and removing a third solvent-rich stream from a bottom of the first SRC;
  (e) introducing a second HC feed containing polar and less polar HCs into a middle portion of an extractive distillation column (EDC) and introducing a majority portion of the third solvent-rich stream from step (d) into an upper portion of the EDC as a selective solvent feed;
  (f) recovering a second water-containing, less polar HC-rich stream from a top of the EDC and withdrawing a fourth solvent-rich stream containing solvent, polar HCs, and heavy HCs and PMs from a bottom of the EDC;
  (g) introducing the fourth solvent-rich stream into a middle portion of a second solvent recovery column (second SRC), recovering a second polar HC-rich stream, that is substantially free of solvent and less polar HCs, from a top of the second SRC, and removing a fifth solvent-rich stream from a bottom of the second SRC, wherein a majority portion of the fifth solvent-rich stream is used as the selective solvent feed in step (a) and the mixture in step (c) includes a minor portion of the fifth solvent-rich stream; and
  (h) installing a transfer line between the third solvent-rich stream in step (d) and the fifth solvent-rich stream in step (g) to adjust the flow rate of the solvent-rich streams to the LLE column in step (a) and to the EDC in step (e).

13. The method of claim 12 wherein the polar HCs are aromatic and the less polar HCs are paraffinic, naphthenic, and olefinic.

14. The method of claim 12 wherein the solvent is selected from the group consisting of sulfolane, alkyl-sulfolane, N-formyl morpholine, N-methyl pyrrolidone, tetraethylene glycol, triethylene glycol, diethylene glycol, and mixtures thereof, with water as the co-solvent.

15. The method of claim 12 wherein the solvent comprises sulfolane with water as the co-solvent.

16. The method of claim 12 wherein the first and second HC feeds have the same composition.

17. The method of claim 12 wherein the first and second HC feeds have different compositions.

18. A method of integrating (i) a liquid-liquid extraction (LLE) process for producing polar hydrocarbons (HCs) from mixtures comprising polar and less polar HCs wherein the LLE process employs (1) a LLE column into which a first HC feed containing polar and less polar HCs is introduced and from which a first water-containing, less polar HC-rich stream is recovered from a top of the LLE column and from which a first solvent-rich stream containing solvent, polar HCs, minor amounts of less polar HCs, and measurable but reduced heavy HCs and polymeric materials (PMs) is withdrawn from a bottom of the LLE column, (2) an extractive stripper column (ESC) into which the first solvent-rich stream is introduced and from which a less polar HC-rich stream but containing a significant of polar HCs is withdrawn from a top of the ESC and recycled to the lower portion of the LLE column as reflux and from which a second solvent-rich stream containing solvent, polar HCs, and measurable but reduced heavy HCs and PMs which is substantially free of less polar HCs is withdrawn from a bottom of the ESC and (3) a first solvent recovery column (SRC) into which the second solvent-rich stream is introduced and from which a first polar HC-rich stream, which is substantially free of solvent and less polar HCs is withdrawn and from which a third solvent-rich stream is withdrawn from a bottom of the first SRC and (ii) an extractive distillation (ED) process for producing polar hydrocarbons (HCs) from mixtures comprising polar and less polar HCs wherein ED process employs (1) an ED column into which a second HC feed containing polar and less polar HCs is introduced and from which a second water-containing, less polar HC-rich stream is recovered from a top of the EDC and from which a fourth solvent-rich stream containing solvent, polar HCs, and measurable heavy HCs and PMs is withdrawn from a bottom of the EDC (2) a second SRC into which the fourth solvent-rich stream is introduced and from which a second polar HC-rich stream, which is substantially free of solvent and less polar HCs is recovered and from which a fifth solvent-rich stream from a bottom of the second SRC is withdrawn, which method comprises the steps of:
  (a) diverting the majority portion of the fifth solvent-rich stream into an upper portion of the LLE column as a selective solvent feed;
  (b) diverting a minor portion of the fifth solvent-rich stream into the ESC;
  (c) diverting the third solvent-rich stream into the ED column, thereby removing heavy HCs and PMs from the fifth solvent-rich stream of the ED process which contains a polar HC selective solvent, measurable amounts of heavy HCs, and PMs that are generated from reactions among thermally decomposed or oxidized solvent, heavy HCs, and additives; and positioning a transfer line between the third solvent-rich stream and the fifth solvent-rich stream and adjusting the flow rate of the solvent-rich streams to the LLE column and to the EDC.

19. The method of claim 18 wherein the polar HCs are aromatic and the less polar HCs are paraffinic, naphthenic, and olefinic.

20. The method of claim 18 wherein the solvent is selected from the group consisting of sulfolane, alkyl-sulfolane, N-formyl morpholine, N-methylpyrrolidone, tetraethylene glycol, triethylene glycol, diethylene glycol, and mixtures thereof, with water as the co-solvent.

21. The method of claim 18 wherein the solvent comprises sulfolane with water as the co-solvent.

22. The method of claim 18 wherein the first and second HC feeds have the same composition.

23. The method of claim 18 wherein the first and second HC feeds have different compositions.

24. The method of claim 18 which comprises the step of:
introducing a mixture comprising the fifth solvent-rich stream and a minor portion of the third solvent-rich stream into an upper portion of the LLE column and the ESC.

25. The method of claim 18 which comprises the step of:
introducing a mixture comprising the third solvent-rich stream and a minor portion of the fifth solvent-rich stream into an upper portion of the EDC.

26. The method of claim 18 which comprises the steps of:
providing a mixing tank;
transferring the third solvent-rich stream and the fifth solvent-rich stream into the mixing tank to form a solvent-rich mixture; and
introducing the solvent-rich mixture into an upper portion of the LLE column and ESC and into an upper portion of the EDC at predetermined flow rates.

27. The method of claim 18 wherein none of the fifth solvent-rich stream from the second SRC is introduced directly into the EDC.

* * * * *